(12) United States Patent
Su et al.

(10) Patent No.: US 9,745,405 B2
(45) Date of Patent: *Aug. 29, 2017

(54) POLYMER, POLYMER MODIFIED TITANIUM DIOXIDE PIGMENT, AND METHOD OF FORMING A PIGMENTED PAINT FORMULATION

(71) Applicant: Tronox LLC, Oklahoma City, OK (US)

(72) Inventors: Quan Su, Edmond, OK (US); Venkata Rama Rao Goparaju, Edmond, OK (US)

(73) Assignee: Tronox LLC, Oklahoma City, OK (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/691,185

(22) Filed: Apr. 20, 2015

(65) Prior Publication Data
US 2016/0304668 A1 Oct. 20, 2016

(51) Int. Cl.
| C08G 65/48 | (2006.01) |
| C08G 18/48 | (2006.01) |
| C08K 3/22 | (2006.01) |

(52) U.S. Cl.
CPC ...... *C08G 18/48* (2013.01); *C08K 2003/2241* (2013.01)

(58) Field of Classification Search
CPC .............................................. C08K 2003/2241
See application file for complete search history.

(56) References Cited

U.S. PATENT DOCUMENTS

| 3,208,866 A | 9/1965 | Lewis et al. |
| 3,512,219 A | 5/1970 | Stern et al. |
| 3,804,810 A | 4/1974 | Fryd |
| 3,856,929 A | 12/1974 | Angerman et al. |
| 3,884,871 A | 5/1975 | Herman et al. |
| 3,923,968 A * | 12/1975 | Basque .................. B82Y 30/00 106/436 |
| 4,075,031 A | 2/1978 | Allen |
| 4,079,028 A | 3/1978 | Emmons et al. |
| 4,158,654 A | 6/1979 | Moczygemba et al. |
| 4,235,985 A | 11/1980 | Tanaka et al. |

(Continued)

FOREIGN PATENT DOCUMENTS

| EP | 2554609 A2 | 6/2013 |
| SG | 183521 A1 | 10/2012 |

(Continued)

OTHER PUBLICATIONS

Tronox LLC, International Search Report and Written Opinion dated Jun. 27, 2014 in PCT/US14/022325.

(Continued)

*Primary Examiner* — Michael A Salvitti
(74) *Attorney, Agent, or Firm* — McAfee & Taft

(57) ABSTRACT

A new polymer that is capable of forming a composite with titanium dioxide particles and latex particles when admixed therewith is provided. The new polymer includes a water soluble polymer backbone, a first functional group attached to the polymer backbone and having an affinity for latex, and a second functional group attached to the polymer backbone and capable of forming a bond with titanium dioxide. A polymer modified titanium dioxide pigment and a method of forming a pigmented paint formulation are also provided.

20 Claims, 3 Drawing Sheets

(56) References Cited

U.S. PATENT DOCUMENTS

| | | | |
|---|---|---|---|
| 4,678,840 A | | 7/1987 | Fong et al. |
| 4,824,886 A | | 4/1989 | Schmidt et al. |
| 5,023,309 A | | 6/1991 | Kruse et al. |
| 5,171,772 A | * | 12/1992 | Hoy .................... C08G 83/001 |
| | | | 524/457 |
| 5,201,949 A | | 4/1993 | Allen et al. |
| 5,203,916 A | | 4/1993 | Green et al. |
| 5,332,433 A | | 7/1994 | Story et al. |
| 5,700,318 A | | 12/1997 | Brand et al. |
| 5,804,639 A | * | 9/1998 | Schopwinkel ...... B01F 17/0028 |
| | | | 524/497 |
| 5,840,112 A | | 11/1998 | Morris et al. |
| 5,913,972 A | * | 6/1999 | Kanou ............... C08G 63/6884 |
| | | | 106/31.87 |
| 5,922,120 A | | 7/1999 | Subramanian et al. |
| 5,976,237 A | | 11/1999 | Halko et al. |
| 6,080,802 A | | 6/2000 | Emmons et al. |
| 6,207,131 B1 | | 3/2001 | Magyar et al. |
| 6,262,152 B1 | | 7/2001 | Fryd et al. |
| 6,350,427 B1 | | 2/2002 | Yuill et al. |
| 6,562,314 B2 | | 5/2003 | Akhtar et al. |
| 7,179,531 B2 | | 2/2007 | Brown et al. |
| 7,264,672 B1 | * | 9/2007 | Trabzuni ............... C09C 1/3661 |
| | | | 106/436 |
| 7,485,343 B1 | | 2/2009 | Branson et al. |
| 8,163,078 B2 | | 4/2012 | Tarng et al. |
| 9,315,615 B2 | * | 4/2016 | Goparaju ............... C08G 18/83 |
| 2003/0108667 A1 | * | 6/2003 | McIntyre ............... B82Y 30/00 |
| | | | 427/212 |
| 2004/0265756 A1 | * | 12/2004 | Horie .................... C08G 77/442 |
| | | | 430/434 |
| 2005/0228124 A1 | | 10/2005 | Swarup et al. |
| 2006/0000390 A1 | | 1/2006 | Bolt et al. |
| 2006/0188722 A1 | | 8/2006 | White et al. |
| 2008/0171818 A1 | | 7/2008 | May |
| 2009/0253853 A1 | * | 10/2009 | Lin .................... B32B 17/10247 |
| | | | 524/497 |
| 2012/0058278 A1 | | 3/2012 | Bohling et al. |
| 2012/0316276 A1 | * | 12/2012 | Iwasa .................... C09D 11/17 |
| | | | 524/388 |
| 2013/0096250 A1 | | 4/2013 | Bohling et al. |
| 2014/0011943 A1 | | 1/2014 | Bardman et al. |
| 2014/0194566 A1 | | 7/2014 | Auld et al. |
| 2014/0275442 A1 | * | 9/2014 | Goparaju ............... C08G 18/83 |
| | | | 525/440.01 |
| 2014/0329935 A1 | | 11/2014 | Palmer, Jr. et al. |
| 2015/0025172 A1 | | 1/2015 | Bohling et al. |
| 2016/0122472 A1 | * | 5/2016 | Su .................... C08G 65/33368 |
| | | | 524/612 |
| 2016/0304668 A1 | * | 10/2016 | Su ........................ C08G 18/48 |

FOREIGN PATENT DOCUMENTS

| | | |
|---|---|---|
| WO | 03004767 A1 | 1/2003 |
| WO | 2011112171 A1 | 9/2011 |
| WO | 2012008441 A1 | 1/2012 |
| WO | 2012058093 A1 | 5/2012 |
| WO | 2012116025 A1 | 8/2012 |
| WO | 2013002999 A1 | 1/2013 |
| WO | 2013004004 A1 | 1/2013 |
| WO | 2013032782 A1 | 3/2013 |
| WO | 2013169676 A1 | 11/2013 |
| WO | 2014150128 A1 | 9/2014 |
| WO | 2015010016 A1 | 1/2015 |

OTHER PUBLICATIONS

Kostansek, Edward, Associative Polymer/Particle Dispersion Phase Diagrams III: Pigments, JCT Research, vol. 3, No. 3, Jul. 2006, pp. 165-171.

Svanholm, T. et al., Adsorption studies of associative interactions between thickener and pigment particles, Progress in Organic Coatings 30 (1997), pp. 167-171.

Melville, I. et al., Pigment Thickener Interactions in Emulsion Paints, Polymers Paint Colour Journal, Mar. 18, 1997, vol. 177, No. 4187, pp. 174-184.

Tarng, Ming-Ren, Unifying Model for Associative Thickener Influences on Waterborne Coatings: II. Competitive Adsorption of Nonionic Surfactants and HEUR Thickeners on Titanium Dioxide Pretreated with Inorganic Stabilizers and Organic Oligomeric Dispersants, Journal of Coatings Technology, vol. 74, No. 935, Dec. 2002.

Glass, Edward J., Adsorption of hydrophobically-modified, ethoxylated urethane thickeners on latex and titanium dioxide disperse phases, Advances in Colloid and Interface Science 79 (1999) 123-148.

International Search Report and Written Opinion dated Jul. 10, 2014 in PCT/US2014/27916, Tronox LLC.

Wijting, WK et al., Competitive adsorption of (phosphorylated) ethoxylated styrene oxide polymer and polyacrylic acid on silica coated iron oxide pigment. Colloids and Surfaces A: Physicochemical and Engineering Aspects. May 1, 2014. vol. 449; pp. 19-30.

International Search Report and Written Opinion dated Aug. 11, 2016 in corresponding international application No. PCT/US16/27428, Tronox LLC.

Examination Report No. 1 dated Feb. 27, 2017 in corresponding Australia Patent Application No. 2016252010, Tronox LLC.

Office Action and Search Report dated Dec. 28, 2016 in related Taiwan patent application No. 105107958, Tronox LLC.

* cited by examiner

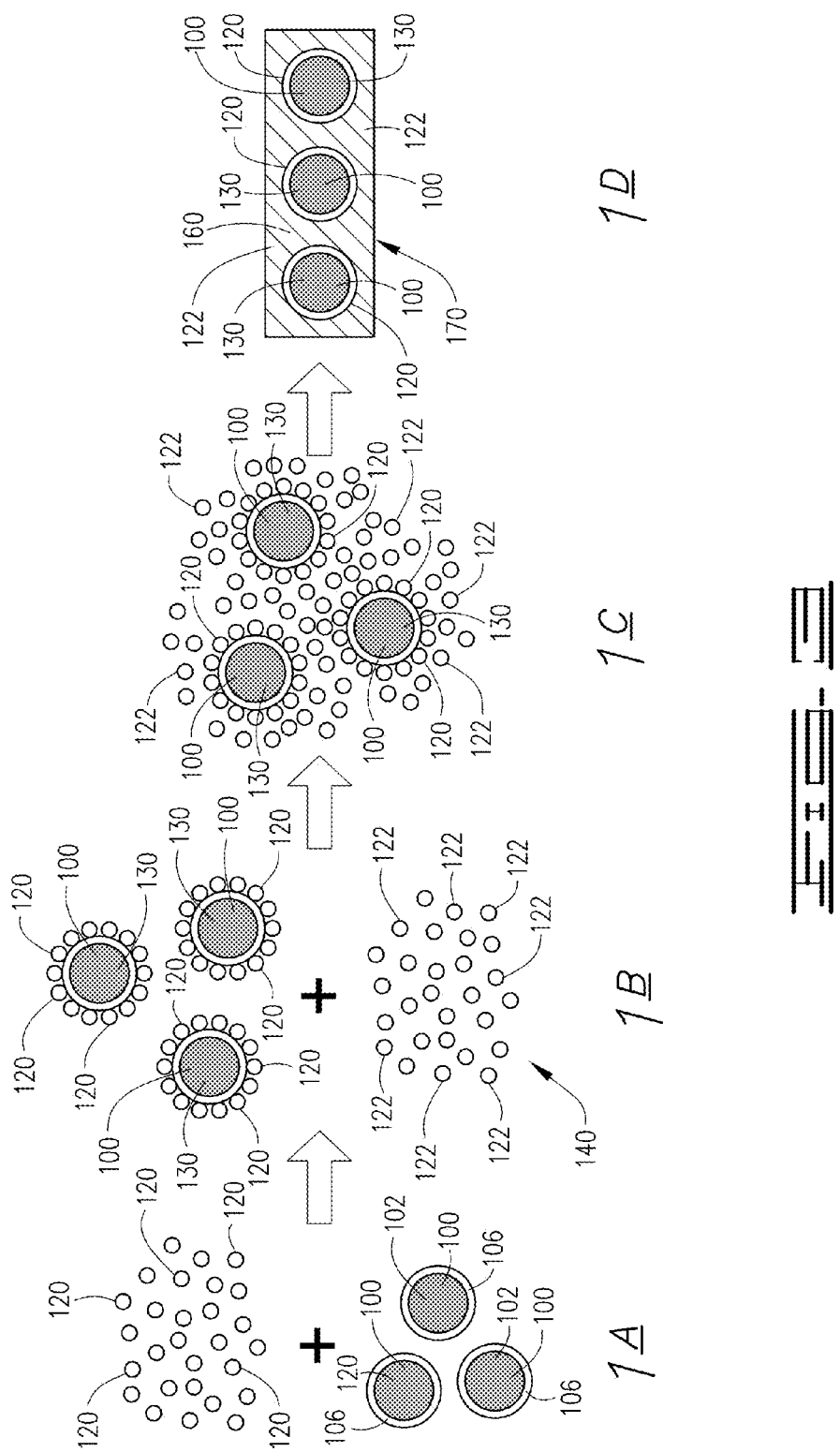

POLYMER, POLYMER MODIFIED TITANIUM DIOXIDE PIGMENT, AND METHOD OF FORMING A PIGMENTED PAINT FORMULATION

BACKGROUND

Titanium dioxide is a well known pigment and white opacifying agent. For example, titanium dioxide pigments are used in connection with coating formulations (including paint and ink formulations), paper compositions, polymer compositions and other products. Such pigments are generally produced in powder form with specific properties and characteristics depending on the final application. Titanium dioxide is a very effective, white opacifying pigment. It can be manufactured by either the sulfate process or the chloride process.

In the sulfate process for manufacturing titanium dioxide, a titanium slag ore is dissolved in sulfuric acid to form titanyl sulfate. The titanyl sulfate is then hydrolyzed to form hydrous titanium dioxide. The hydrated titanium dioxide is heated in a calciner to grow titanium dioxide crystals to pigmentary dimensions.

In the chloride process for manufacturing titanium dioxide, a dry titanium dioxide ore is fed into a chlorinator together with coke and chlorine to produce a gaseous titanium halide (such as titanium tetrachloride). The produced titanium halide is purified and oxidized in a specially designed reactor at a high temperature to produce titanium dioxide particles having a desired particle size. Aluminum chloride or some other co-oxidant is typically added to the titanium halide in the oxidation reactor to facilitate rutile formation and control particle size. The titanium dioxide and gaseous reaction products are then cooled and the titanium dioxide particles are recovered.

Whether produced by the sulfate process or the chloride process, the produced titanium dioxide particles are typically coated with one or more inorganic materials to modify or enhance the properties and characteristics of the pigment for particular applications. For example, the pigment particles are often coated with compounds that function to improve the opacity, light stability and durability of the pigment. Examples of inorganic materials used to coat titanium dioxide pigments include alumina and silica.

A primary property that a titanium dioxide pigment contributes to paint, paper, plastic and other products is hiding power. The hiding power of a titanium dioxide pigment is based on the ability of the pigment to scatter light in the base product (for example, a paint formulation) to which it is added. The ability of the pigment to scatter light in the base product to which it is added (the light scattering efficiency of the pigment) depends on various factors, including the particle size of the pigment, the difference in refractive index of the pigment particles and their surroundings (for example, a large difference in the refractive index of the pigment particles and the base product results in a high scattering efficiency), and the proximity of the pigment particles to one another. These factors have been addressed in various ways with varying degrees of success.

A potential problem that is associated with the use of titanium dioxide pigments in an aqueous based paint formulation is the tendency of the pigment particles to agglomerate in the paint formulations. Agglomeration of the pigment particles in a paint formulation can adversely impact desirable properties of the pigment including the opacity, brightness, tint strength and other optical properties of the pigment.

For example, problematic pigment agglomeration in aqueous based paint formulations often occurs after a paint film has been applied to a substrate and while the paint film dries. This phenomenon, sometimes referred to as optical crowding, can decrease the light scattering efficiency of the pigment particles. Consequently, the tint strength of the pigment can be diminished.

The problem of agglomeration of the pigment particles in an aqueous based paint formulation is exacerbated when the pigment is utilized in a paint formulation at a high pigment volume concentration ("PVC"). When the PVC in a paint formulation increases to a certain level, the light scattering efficiency of the pigment can substantially decrease. At high PVC values, the pigment particles are closer to one another, which results in an overlap of the respective light scattering cross-sections of the particles and thereby reduces the light scattering efficiency of the dispersed pigment. In addition to the light scattering efficiency of the pigment, the optical crowding effect can also decrease the light stability, brightness and opacity of the pigment.

Various techniques have been utilized in an attempt to diminish the optical crowding effect and address the other problems noted above. For example, fillers and extenders such as clay, calcium carbonate, alumina and silica have been added to paint base products to space adjacent pigment particles apart from one another. Hollow sphere, opaque polymers have been added to base paint products to create air voids in the base products that function to space the pigment particles apart. Also, pigment particles have been coated with certain inorganic compounds that function to modify the surface properties of the particles in a manner that discourages agglomeration of the particles.

SUMMARY

In one aspect, a new polymer that is capable of forming a composite with titanium dioxide particles and latex particles when admixed therewith is provided. The polymer comprises a water soluble polymer backbone, at least one hydrophobic functional group attached to the polymer backbone and having an affinity for latex, and at least one functional group attached to the polymer backbone and capable of forming a bond with titanium dioxide.

In another aspect, a polymer modified titanium dioxide pigment that is capable of forming a composite with latex particles when admixed therewith is provided. The polymer modified titanium dioxide pigment comprises a plurality of titanium dioxide particles, and a polymer associated with the titanium dioxide particles. The polymer associated with the titanium dioxide particles is the inventive polymer. The functional group of the inventive polymer that is attached to the polymer backbone and capable of forming a bond with titanium dioxide is bonded to the titanium dioxide particles.

In yet another aspect, a method of forming a pigmented paint formulation is provided. The method comprises the steps of providing a polymer modified titanium dioxide pigment, providing a plurality of separate latex particles, providing a latex-based paint formulation, mixing the polymer modified titanium dioxide pigment with the separate latex particles to form a polymer modified pigment-latex composite, and mixing the polymer modified pigment-latex composite with the latex-based paint formulation to form a pigmented latex-based paint formulation. The polymer modified titanium dioxide pigment provided in accordance with the method is the inventive polymer modified titanium dioxide pigment.

BRIEF DESCRIPTION OF THE DRAWINGS

FIG. 3 schematically illustrates a part of the inventive method of forming a pigmented paint formulation.

DETAILED DESCRIPTION

Figure 1:
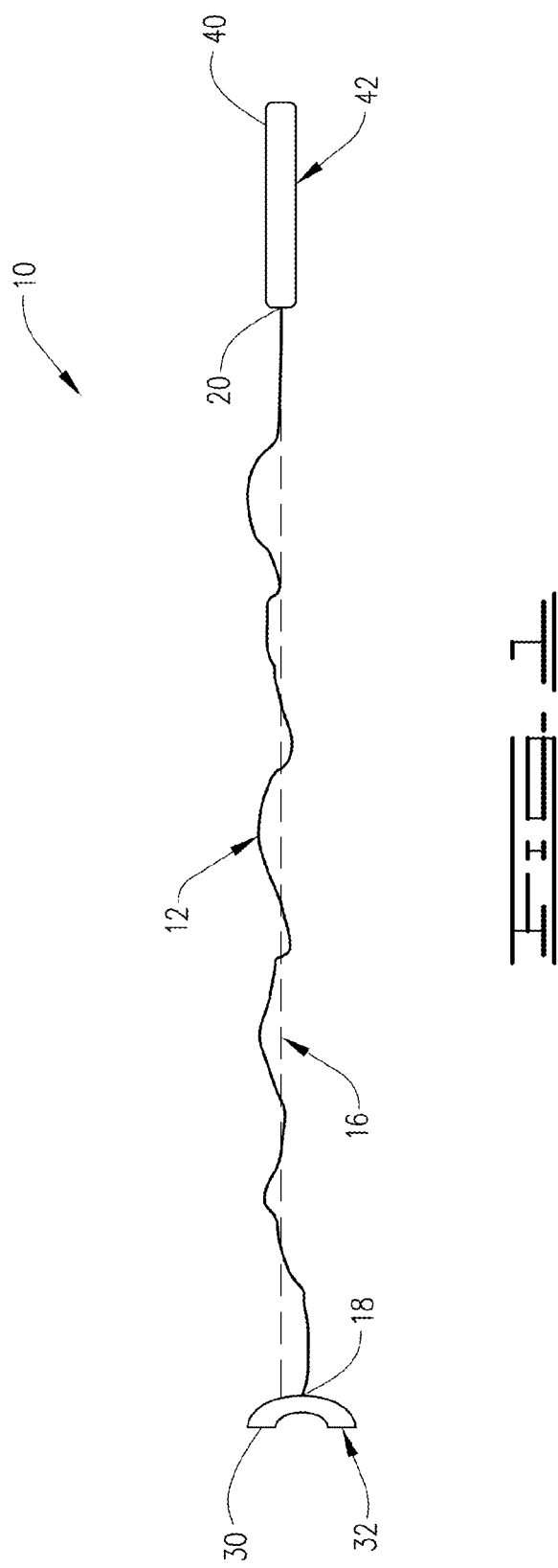
FIG. 1 schematically illustrates a particular embodiment of the inventive polymer wherein the polymer includes a linear polymer backbone that has a functional group bonded to titanium dioxide attached at one end thereby forming the head of the polymer and a functional group having an affinity for latex attached at the other end thereby forming the tail of the polymer.

The following detailed description of the invention describes various aspects and embodiments of the invention and is intended to describe the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In one aspect, the present invention is a new polymer that is capable of forming a composite with titanium dioxide particles and latex particles when admixed therewith. In another aspect, the present invention is a polymer modified titanium dioxide pigment that is capable of forming a composite with latex particles when admixed therewith. In yet another aspect, the invention is a method of forming a pigmented paint formulation.

The inventive polymer that is capable of forming a composite with titanium dioxide particles and latex particles when admixed therewith comprises a water soluble polymer backbone, at least one hydrophobic functional group attached to the polymer backbone and having an affinity for latex (hereafter a "latex functional group"), and at least one functional group attached to the polymer backbone and capable of forming a bond with titanium dioxide (hereafter a "titanium dioxide functional group"). For example, the latex functional group and the titanium dioxide functional group can be covalently bonded to the polymer backbone.

As used herein and in the appended claims, titanium dioxide and titanium dioxide pigment each mean a plurality of titanium dioxide particles. Latex and latex particles each mean latex resin particles that can be dispersed in an aqueous medium such as water to form an aqueous based, latex coating formulation such as a latex paint formulation. The latex can be synthetic or natural latex. For example, the latex can be an acrylic, a vinyl acrylic or a styrene acrylic latex resin.

As used herein and in the appended claims, the term "polymer" includes homopolymers and copolymers. A titanium dioxide functional group means a functional group capable of forming a bond with titanium dioxide. A latex functional group means a hydrophobic functional group having an affinity for latex.

Also, as used herein and in the appended claims, one component "having an affinity for" a second component means that the one component is held in proximity to the second component when the two components are admixed together due to van der Waals forces, hydrogen bonding, polar-polar attraction, hydrophobic-hydrophobic association and/or other similar interactions. The type or types of interactions can vary depending on the nature of the functional group. As used herein, one component "capable of forming a bond with" a second component means that the one component forms or has formed a covalent, ionic, or hydrogen bond with the second component when the two components are admixed together. The type or types of bonds can vary depending on the nature of the functional group.

In one embodiment, the titanium dioxide functional group is formed by the reaction of the polymer backbone with a compound selected from the group consisting of acids of phosphorous, hydroxyl carboxylic acid, salts of hydroxyl carboxylic acid, polycarboxylic acid, salts of polycarboxylic acids, carboxylate based betaines, sulfonate based betaines, phosphate based betaines and mixtures thereof. For example, specific acids of phosphorus that can be reacted with the polymer backbone to form the titanium dioxide functional group include phosphoric acid, salts of phosphoric acid, phosphonic acid, salts of phosphonic acid, phosphoric-carboxylic acid, salts of phosphoric carboxylic acid, phosphonic-carboxylic acid and salts of phosphonic-carboxylic acid.

For example, the titanium dioxide functional group can be formed by the reaction of the polymer backbone with a compound selected from the group consisting of phosphonic-carboxylic acid, salts of phosphonic-carboxylic acid, hydroxyl carboxylic acid, salts of hydroxyl carboxylic acid, polycarboxylic acid, salts of polycarboxylic acids, carboxylate based betaines, sulfonate based betaines, phosphate based betaines and mixtures thereof.

For example, the titanium dioxide functional group can be formed by the reaction of the polymer backbone with a compound selected from the group consisting of phosphoric acid and salts of phosphoric acid. For example, the titanium dioxide functional group can be formed by the reaction of the polymer backbone with a compound selected from the group consisting of phosphonic acid and salts of phosphonic acid. By way of further example, the titanium dioxide functional group can be formed by the reaction of the polymer backbone with phosphonic acid.

For example, the titanium dioxide functional group can be formed by the reaction of the polymer backbone with a compound selected from the group consisting of phosphoric-carboxylic acids and salts of phosphoric-carboxylic acids.

For example, the titanium dioxide functional group can be formed by the reaction of the polymer backbone with a compound selected from the group consisting of phosphonic-carboxylic acids and salts of phosphonic-carboxylic acids. For example, the titanium dioxide functional group can be formed by the reaction of the polymer backbone with a phosphonic-carboxylic acid. By way of further example, the titanium dioxide functional group can be formed by the reaction of the polymer backbone with 2-phosphonobutane-1,2,4-tricarboxylic acid.

For example, the titanium dioxide functional group can be formed by the reaction of the polymer backbone with a compound selected from the group consisting of hydroxyl carboxylic acid, salts of hydroxyl carboxylic acid, polycarboxylic acid and salts of polycarboxylic acid. For example, the titanium dioxide functional group can be formed by the reaction of the polymer backbone with a hydroxyl carboxylic acid. For example, the titanium dioxide functional group can be formed by the reaction of the polymer backbone with a compound selected from the group consisting of citric acid, tartaric acid and mixtures thereof. For example, the titanium dioxide functional group can be formed by the reaction of the polymer backbone with citric acid. For example, the titanium dioxide functional group can be formed by the reaction of the polymer backbone with tartaric acid.

For example, the titanium dioxide functional group can be formed by the reaction of the polymer backbone with a compound selected from the group consisting of carboxylate based betaines, sulfonate based betaines, phosphate based betaines and mixtures thereof. As used herein, a betaine is a chemical compound with a positively charged cationic functional group wherein the cationic functional group does not comprise a hydrogen atom and with a negatively charged functional group which is not adjacent to the cationic functional group. Accordingly, a carboxylate based betaine is a betaine further comprising a carboxylate functional group, a sulfonate based betaine is a betaine further comprising sulfonate based functional group and a phosphate based betaine is a functional group further comprising a phosphate based functional group.

For example, the latex functional group can be a super hydrophobic functional group. As used herein and in the appended claims, a hydrophobic functional group means a functional group that lacks an attraction to water or is repelled by water. A super hydrophobic functional group means that the contact angle of water on the functional group exceeds 150°.

For example, the latex functional group can be formed by the reaction of the polymer backbone with a compound selected from the group of aliphatic compounds, aromatic compounds and aliphatic-aromatic compounds. By way of further example, the latex functional group is formed by the reaction of the polymer backbone with a compound selected from the group of alkyl/cycloalkyl/aryl/alkylaryl alcohols, alkyl/cycloalkyl/aryl/alkylaryl acids, and alkyl/cycloalkyl/aryl/alkylaryl amides. By way of further example, the latex functional group can be formed by the reaction of the polymer backbone with an ethoxylated alkyl/cycloalkyl/aryl/alkylaryl alcohol.

By way of further example, the latex functional group can be formed by the reaction of the polymer backbone with an alcohol. For example, the latex functional group can be formed by the reaction of the polymer backbone with a compound selected from the group consisting of fatty alcohols, saturated ethoxylated alcohols, alkyl phenols, aryl phenols, ethoxylated alkyl phenols and ethoxylated aryl phenols. For example, the latex functional group can be formed by the reaction of the polymer backbone with a compound selected from the group consisting of fatty alcohols, ethoxylated alcohols and phenols. Examples include C6 to C24 saturated alcohols such as cetyl alcohol and stearyl alcohol, C6 to C24 unsaturated alcohols such as erucyl alcohol, C6 to C24 saturated ethoxylated alcohols such as polyoxyethylene (10) stearyl ether (for example, sold as Brij™ S10 by Croda®), and C6 to C24 unsaturated ethoxylated alcohols such as polyoxyethylene (20) oleyl ether (for example, Brij™ O20 sold by Croda®), nonylphenol, and tristyrylphenol.

For example, the latex functional group can be formed by the reaction of the polymer backbone with a compound selected from the group consisting of esters, thiols, acids, anhydrides and acyl halides. For example, the latex functional group can be formed by the reaction of the polymer backbone with a compound selected from the group consisting of fatty acid esters, fatty thiols, fatty acids and fatty acid anhydrides. Examples include methyl stearate, 1-dodecanethiol, palmitic acid and fatty acid chlorides.

For example, the water soluble polymer backbone can comprise nitrogen. For example, the water soluble polymer backbone can be selected from the group consisting of polyvinylpyrrolidone, polyethylenimine, polyoxazolines and polyamides.

For example, the water soluble polymer backbone can be selected from the group consisting of polyoxyalkylenes, polysaccharide, polyoxazoline, and polyvinyl ether. For example, the water soluble polymer backbone can be a polyoxyalkylene polymer or copolymer. By way of further example, the water soluble polymer backbone can be polyoxymethylene. For example, the water soluble polymer backbone can be polyethylene glycol or polypropylene glycol. For example, the water soluble polymer backbone can be polyethylene glycol-co-polypropylene glycol. For example, the water soluble polymer backbone can be polyacrylic acid. By way of example, the water soluble polymer backbone can be poly(methylvinyl ether) or poly(ethylvinyl ether).

The number of titanium dioxide functional groups and latex functional groups attached to the polymer backbone can vary. For example, in one embodiment, the polymer comprises a plurality of titanium dioxide functional groups, and a single latex functional group. In another embodiment, the polymer comprises a plurality of latex functional groups, and a single titanium dioxide functional group. In yet another embodiment, the polymer comprises a plurality of titanium dioxide functional groups and a plurality of latex functional groups. The titanium dioxide function group(s) and latex functional group(s) can be attached at any point on the polymer backbone.

The titanium dioxide functional group(s) and latex functional group(s) can be attached at any point on the polymer backbone. For example, one or more titanium dioxide functional groups can be attached at one end of the polymer backbone, and one or more latex functional groups can be attached at the other end of the polymer backbone.

The water soluble polymer backbone can be linear, branched, or star shaped. For example, the water soluble polymer backbone can have a molecular weight in the range of 1,000 to 60,000. By way of further example, the water soluble polymer backbone can have a molecular weight in the range of 1,500 to 30,000. By way of further example, the water soluble polymer backbone can have a molecular weight in the range of 2,000 to 10,000. As used herein and in the appended claims, the "molecular weight" of the polymer backbone or other polymer means the number average molecular weight of the polymer backbone or other polymer. The water soluble backbone can be solvated in aqueous media (e.g., water), whereby it acts as a connecting bridge between the titanium dioxide particles bonded to the titanium dioxide functional group of the polymer and the latex particles associated with the latex functional group of the polymer.

In one embodiment, the water soluble polymer backbone is a linear polymer backbone having a longitudinal axis, and having a first end and a second end. For example, one or more titanium dioxide functional groups can be attached to the first end of the polymer backbone, each thereby forming a head of the polymer, and one or more latex functional groups can be attached to the second end of the polymer backbone, each thereby forming a tail of the polymer. In other embodiments, the polymer can comprise multiple backbones attached to one or more titanium dioxide functional groups and one or more latex functional groups.

For example, in one embodiment, the inventive polymer that is capable of forming a composite with titanium dioxide particles and latex particles when admixed therewith has the following formula:

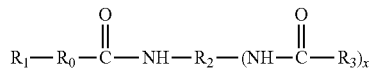

wherein $R_0$ is the water soluble polymer backbone, $R_1$ is the hydrophobic functional group attached to the polymer backbone and having an affinity for latex, $R_2$ is formed by the reaction of a diisocyanate or polyisocyanate with the water soluble polymeric backbone, $R_3$ is the functional group attached to the polymer backbone and capable of forming a bond with titanium dioxide, and x is any integer greater than or equal to one. For example, $R_0$ can have the following formula:

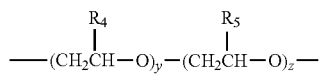

wherein $R_4$ and $R_5$ are compounds selected from the group consisting of hydrogen, methyl, ethyl, propyl, butyl, or pentyl groups and can be the same or different and wherein y and z can both be any integer greater than or equal to one. For example, $R_1$ can be an alkyl, aryl, or alkylaryl group or an ethoxylate of an alkyl, aryl, or alkylaryl group having greater than 6 carbon atoms. Examples of isocyanates that can be used to form $R_2$ include hexamethylene diisocyanate, hexamethylene diisocyanate homopolymers, isophorone diisocyanate, and isophorone diisocyanate homopolymers.

An example of a commercially available polymer that includes a suitable polymer backbone and latex functional group for use in connection with the inventive polymer is polyoxyethylene stearyl ether. For example such a compound can have the following formula:

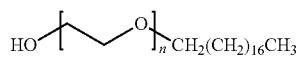

wherein n is 30 to 200.
The ethylene oxide repeating unit of the above compound can function as the polymer backbone of the inventive polymer. The linear carbon aliphatic tail of the above compound can function as the latex functional group of the inventive polymer. Thus, the polyoxyethylene stearyl ether has both a tail serving as a latex functional group and a suitable polymer backbone. For example, such a compound wherein "n" in the above formula is 100 is sold by Croda® USA as Brij™ (100) stearyl ether in association with the designation Brij™ S100. Other examples of commercially available polymers that contain both a water soluble polymer backbone and a latex functional group and can be used in connection with the inventive polymer include nonylphenol ethoxylate (for example, Igepal® CO-987 as sold by Rhodia®), dinonylphenol ethoxylate (for example, Igepal® DM-970 as sold by Rhodia®), tri-sec-butylphenol ethoxylate (for example, Sapogenat® T 500 as sold by Clariant®), and tristyrylphenol ethoxylate (for example, Emulsogen® TS540 as sold by Clariant®).

The water solubility of the polymer backbone helps keep the inventive polymer from collapsing on the surface of the titanium dioxide media and helps assure that the polymer continues to function in an aqueous based coating formulation even as the coating formulation dries. Although the polymer backbone of the inventive polymer is water soluble in general, it can include some repeating units that are insoluble in an aqueous media. For example, in some embodiments, the polymer backbone is a copolymer having some insoluble repeating units.

Figure 2:
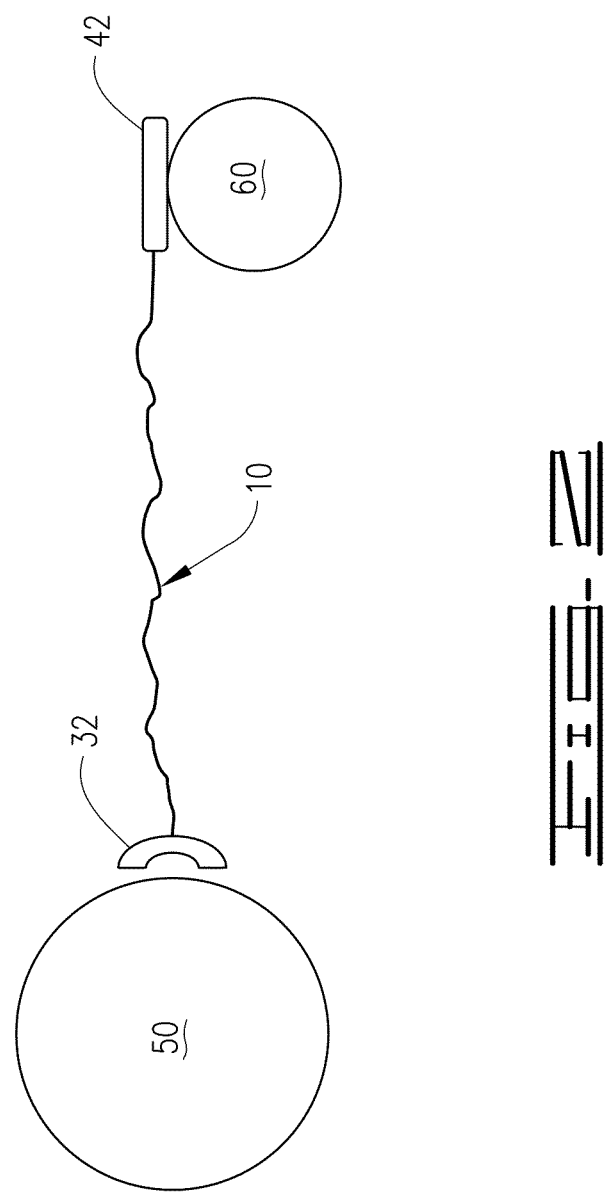
FIG. 2 schematically illustrates how the embodiment of the inventive polymer shown by FIG. 1 interacts with titanium dioxide particles and latex particles.

Referring now to the drawings, and in particular FIGS. 1 and 2, one particular embodiment of the inventive polymer that is capable of forming a composite with titanium dioxide particles and latex particles when admixed therewith is schematically illustrated and generally designated by the reference numeral 10. In this embodiment, the polymer 10 includes a linear polymer backbone 12 having a longitudinal axis 16. The polymer backbone 12 has a first end 18 and a second end 20. A titanium dioxide functional group 30 is attached to the first end 18 of the polymer backbone 12 and forms a head 32 of the polymer 10. A latex functional group 40 is attached to the second end 20 of the polymer backbone 12 and forms a tail 42 of the polymer 10.

FIG. 2 illustrates the interaction of the polymer 10 with a titanium dioxide particle 50 and a latex particle 60. As shown by FIG. 2, the head 32 of the polymer 10 is bonded to and thereby associates the rest of the polymer with the titanium dioxide particle 50. The tail 42 of the polymer 10 is associated with and thereby associates the rest of the polymer with a latex particle 60.

The inventive polymer modified titanium dioxide pigment that is capable of forming a composite with latex particles when admixed therewith comprises a plurality of titanium dioxide particles, and a polymer associated with the titanium dioxide particles. The polymer associated with the titanium dioxide particles is the inventive polymer described herein (including all the forms and embodiments of the inventive polymer as described above and in the following examples and claims). The functional group of the inventive polymer that is attached to the polymer backbone and capable of forming a bond with titanium dioxide is bonded to the titanium dioxide particles.

The titanium dioxide particles of the inventive polymer modified titanium dioxide pigment can be manufactured, for example, by the sulfate process or the chloride process, both of which are known in the art. For example, the titanium dioxide particles of the inventive polymer modified titanium dioxide pigment can be rutile titanium dioxide particles manufactured by the chloride process. For example, alumina can be incorporated into the lattice structure of the titanium dioxide particles to promote rutilization and control particle size. If the chloride process for manufacturing the titanium dioxide particles is used, alumina can be imparted to the lattice structure of the particles by adding aluminum chloride to the reactants during the vapor phase oxidation step of the process.

The titanium dioxide particles can be coated with one or more materials to modify the properties and characteristics of the pigment for particular applications. In one embodiment, the titanium dioxide particles are coated by a material selected from the group consisting of silica, alumina and mixtures thereof.

For example, the polymer is present in the inventive polymer modified titanium dioxide pigment in an amount in the range of from about 0.02% to about 2% by weight, based on the weight of the titanium dioxide particles. Unless stated otherwise, as used herein, including the examples and claims, the amount of a component expressed in terms of percent by weight is based on the dry weight of the components. For example, the polymer is present in the polymer modified titanium dioxide pigment in an amount in the range of from about 0.05% to about 1% by weight, based on the weight of the titanium dioxide particles. By way of further example, the polymer is present in the polymer modified titanium dioxide pigment in an amount in the range of from about 0.05% to about 0.5% by weight, based on the weight of the titanium dioxide particles.

For example, the inventive polymer modified titanium dioxide pigment can be formed by mixing the plurality of titanium dioxide particles with the polymer in an aqueous medium. For example, the inventive polymer modified titanium dioxide pigment can be provided in slurry form. By way of further example, the polymer modified titanium dioxide pigment can be formed by mixing the plurality of titanium dioxide particles with the polymer in dry form. For example, the plurality of titanium dioxide particles can be in the form of a powder substantially free of moisture.

In one embodiment, the inventive polymer is associated with the titanium dioxide particles by directly depositing a layer of the inventive polymer on the surface of the particles. In another embodiment, the inventive polymer is associated with the titanium dioxide particles by mixing the polymer with the particles in an aqueous medium such as water. When placed in a solution with titanium dioxide particles, the polymer orients itself such that the titanium dioxide functional group of the polymer bonds to the titanium dioxide particles. In one embodiment, the inventive polymer can be associated with the titanium dioxide particles during the pigment manufacturing process. The polymer modified titanium dioxide pigment particles can then be added to an aqueous based, latex containing paint formulation.

The inventive polymer modified titanium dioxide pigment that is capable of forming a composite with latex particles when admixed therewith has affinity in general for most types of latex. It has a strong enough interaction with latex to form a composite therewith. A polymer modified, pigment-latex composite can be formed, spacing titanium dioxide particles better and resulting in improved hiding power in pigmented latex-based paint formulations. The interaction between the polymer modified titanium dioxide pigment particles and latex particles is primarily due to the properties of the polymer modified titanium dioxide pigment as opposed to the latex. As a result, the inventive polymer modified titanium dioxide pigment can be used in association with most types of latex resins including non-absorptive, conventional latex resins, resulting in improved hiding power in association the corresponding coating formulations. The inventive polymer modified titanium dioxide pigment does not significantly change the other overall properties and performance of the coating formulations.

The inventive method of forming a pigmented paint formulation comprises the steps of: providing a polymer modified titanium dioxide pigment; providing a plurality of separate latex particles, providing a latex-based paint formulation, the latex-based paint formulation including latex particles; mixing the polymer modified titanium dioxide pigment with the separate latex particles to form a polymer modified pigment-latex composite; and mixing the polymer modified pigment-latex composite with the latex-based paint formulation to form a pigmented latex-based paint formulation. As used herein and in the appended claims, separate latex particles means latex particles that are not a part of the latex-based paint formulation provided in accordance with the inventive method.

The polymer modified titanium dioxide pigment provided in accordance with the inventive method is the inventive polymer modified titanium dioxide pigment that is capable of forming a composite with latex particles when admixed therewith described herein (including all the forms and embodiments of the inventive polymer modified titanium dioxide pigment as described above and in the following examples and claims).

For example, the separate latex particles provided in accordance with the inventive method and the latex particles of the latex-based paint formulation provided in accordance with the inventive method can have the same composition or a different composition. In most cases, the separate latex particles provided in accordance with the inventive method and the latex particles of the latex-based paint formulation provided in accordance with the inventive method have the same composition.

A variety of different types of latex particles can be used as the separate latex particles provided in accordance with the inventive method, and/or the latex particles of the latex-based paint formulation provided in accordance with the inventive method. The type of latex particles utilized will depend on the nature of the latex functional group of the inventive polymer used to form the inventive polymer modified titanium dioxide pigment. For example, the separate latex particles provided in accordance with the inventive method, and/or the latex particles of the latex-based paint formulation provided in accordance with the inventive method can be formed of latex selected from the group consisting of acrylic latex, styrene acrylic latex and polyvinyl acrylic latex. For example, the separate latex particles provided in accordance with the inventive method, and/or the latex particles of the latex-based paint formulation provided in accordance with the inventive method can be formed of acrylic latex. For example, the separate latex particles provided in accordance with the inventive method, and/or the latex particles of the latex-based paint formulation provided in accordance with the inventive method can be formed of styrene acrylic latex. For example, the separate latex particles provided in accordance with the inventive method, and/or the latex particles of the latex-based paint formulation provided in accordance with the inventive method can be formed of polyvinyl acrylic latex.

For example, the separate latex particles are mixed with the polymer modified titanium dioxide pigment to form the polymer modified pigment-latex composite in an amount in the range of from about 20% by weight to about 70% by weight based on the weight of the titanium dioxide particles in the polymer modified titanium dioxide pigment. For example, the separate latex particles are mixed with the polymer modified titanium dioxide pigment to form the polymer modified pigment-latex composite in an amount in the range of from about 30% by weight to about 60% by weight based on the weight of the titanium dioxide particles in the polymer modified titanium dioxide pigment. For example, the separate latex particles are mixed with the polymer modified titanium dioxide pigment to form the polymer modified pigment-latex composite in an amount in the range of from about 30% by weight to about 40% by weight based on the weight of the titanium dioxide particles in the polymer modified titanium dioxide pigment.

Referring now to FIG. 3, the inventive method is illustrated in part. The steps of providing a polymer modified titanium dioxide pigment, providing a plurality of separate latex particles, and providing a latex-based paint formulation are not shown by FIG. 3.

As shown by sections 1A and 1B of FIG. 3, polymer modified titanium dioxide pigment particles 100 are mixed with separate latex particles 120 in an aqueous medium (not shown) to form polymer modified, pigment-latex composite particles 130 in the aqueous medium. The polymer modified titanium dioxide pigment particles 100 each include a titanium dioxide particle 102 and the inventive polymer 106 associated therewith. Specifically, the titanium dioxide functional group of the polymer 106 is bonded to the corresponding titanium dioxide particle 102. The latex functional group of the polymer 106 interacts with latex separate particles 120 to cause the separate latex particles 120 to be absorbed on the surface of the polymer modified titanium dioxide pigment particles 100 and surround the particles 100 to form the polymer modified, pigment-latex composite particles 130. The polymer modified titanium dioxide pigment particles 100 can be mixed with the separate latex particles 120 in an aqueous medium (not shown) to form the polymer modified, pigment-latex composite particles 130 at low shear.

As shown by sections 1B and 1C of FIG. 3, the polymer modified, pigment-latex composite particles 130 are then mixed with a latex-based paint formulation 140 (including latex particles 122 dispersed in an aqueous medium; e.g., liquid paint) (only the latex particles 122 of the paint formulation 140 are shown) to form a pigmented, latex-based paint formulation 150 (only the polymer modified, pigment-latex composite particles 130, latex particles 120 and latex particles 122 are shown). The polymer modified, pigment-latex composite particles 130 are dispersed evenly throughout the pigmented, latex-based paint formulation 150.

Section 1D of FIG. 3 illustrates a dry paint film 160 of the pigmented latex-based paint formulation 150 that has been applied to a wall or other surface 170 and allowed to dry. Because latex particles 120 are strongly absorbed on polymer modified titanium dioxide particles 100, titanium dioxide particles 100 are prevented from contacting one another and remain evenly dispersed in the paint formulation 150 even though the paint formulation has dried.

Thus, in one particular embodiment, the invention is a new polymer that is capable of forming a composite with titanium dioxide particles and latex particles when admixed therewith. The polymer comprises a water soluble polymer backbone, at least one hydrophobic functional group attached to the polymer backbone and having an affinity for latex, and at least one functional group attached to the polymer backbone and capable of forming a bond with titanium dioxide. In this embodiment, the functional group attached to said polymer backbone and capable of forming a bond with titanium dioxide is formed by the reaction of said polymer backbone with a compound selected from the group consisting of acids of phosphorous, hydroxyl carboxylic acid, salts of hydroxyl carboxylic acid, polycarboxylic acid, salts of polycarboxylic acids, carboxylate based betaines, sulfonate based betaines, phosphate based betaines and mixtures thereof.

In another particular embodiment, the invention is a polymer modified titanium dioxide pigment that is capable of forming a composite with latex particles when admixed therewith. The polymer modified titanium dioxide pigment comprises a plurality of titanium dioxide particles, and a polymer associated with the titanium dioxide particles. The polymer associated with the titanium dioxide particles is the inventive polymer. In this embodiment, the functional group of the inventive polymer that is attached to the polymer backbone and capable of forming a bond with titanium dioxide is bonded to the titanium dioxide particles and is formed by the reaction of said polymer backbone with a compound selected from the group consisting of acids of phosphorous, hydroxyl carboxylic acid, salts of hydroxyl carboxylic acid, polycarboxylic acid, salts of polycarboxylic acids, carboxylate based betaines, sulfonate based betaines, phosphate based betaines and mixtures thereof.

In yet another embodiment, the invention is a method of forming a pigmented paint formulation. The method comprises the steps of providing a polymer modified titanium dioxide pigment, providing a plurality of separate latex particles, providing a latex-based paint formulation, mixing the polymer modified titanium dioxide pigment with the separate latex particles to form a polymer modified pigment-latex composite, and mixing the polymer modified pigment-latex composite with the latex-based paint formulation to form a pigmented latex-based paint formulation. The polymer modified titanium dioxide pigment provided in accordance with the method comprises a plurality of titanium dioxide particles, and a polymer associated with the titanium dioxide particles. The polymer associated with the titanium dioxide particles is the inventive polymer. In this embodiment, the functional group of the inventive polymer that is attached to the polymer backbone and capable of forming a bond with titanium dioxide is bonded to the titanium dioxide particles and formed by the reaction of said polymer backbone with a compound selected from the group consisting of acids of phosphorous, hydroxyl carboxylic acid, salts of hydroxyl carboxylic acid, polycarboxylic acid, salts of polycarboxylic acids, carboxylate based betaines, sulfonate based betaines, phosphate based betaines and mixtures thereof.

ILLUSTRATIVE EXAMPLES

The present invention is illustrated by the following examples.

In the examples that follow, Brij™ S100 refers to polyoxyethylene (100) stearyl ether as sold by Croda® USA. Tolonate™ HDB-LV refers to hexamethylene diisocyanate homopolymer as sold by Vencorex®. Bayhibit AM® refers to a 2-phosphonobutane-1,2,4-tricarboxylic acid solution as sold by Lanxess®. FTIR refers to Fourier transform infrared spectroscopy.

In each the following synthesis examples 1-7, polyoxyethylene (100) stearyl ether (Brij™ sold by Croda® USA) was used to form the water soluble polymer backbone and the hydrophobic latex functional group of the inventive polymer. The titanium dioxide functional group of the inventive polymer was varied in each example. The isocyanate group used in the synthesis was also varied. A schematic illustrating the synthesis procedure is set forth below:

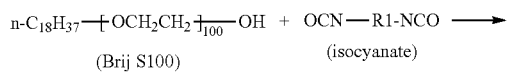

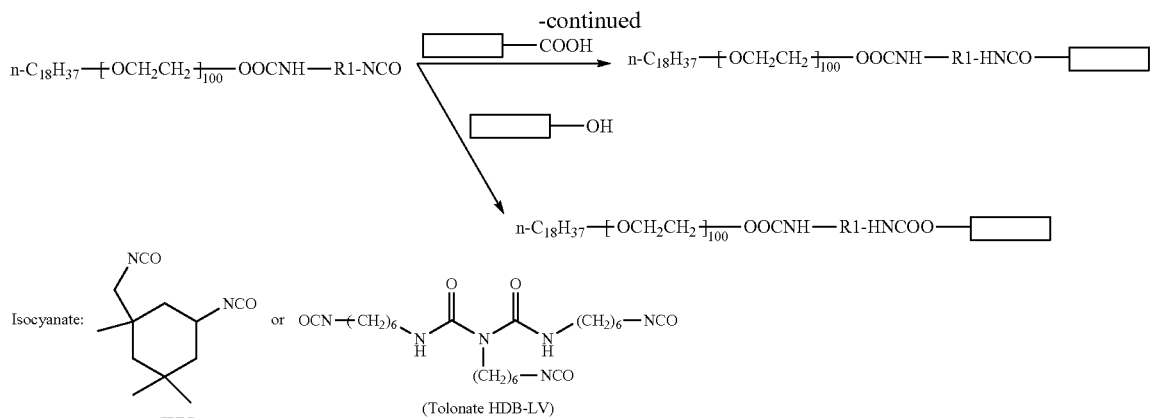

☐ = TiO2 affinity head containing groups such as phosphoric acid, carboxylic acid, silane etc.

Synthesis Example 1

A solution of 2-phosphonobutane-1,2,3-tricarboxylic acid and dimethylformamide was prepared. First, a 50% aqueous solution of 2-phosphonobutane-1,2,4-tricarboxylic acid (Bayhibit AM®) was dried in an oven at 105° C. to remove water from the solution. The residual was dissolved in dry dimethylformamide to form an 11.5% 2-phosphonobutane-1,2,3-tricarboxylic acid/dimethylformamide solution.

Nitrogen protection was used during the reaction. 9.34 grams of Brij® S100 and 60 milliliters of toluene were combined in a three neck round-bottom flask. Residual water from the mixture was removed by azeotropic distillation. The product was then cooled down to 50° C. at which point 1.07 grams of Tolonate™ HDB-LV in 5 milliliters toluene and 0.10 grams of dibutyltin dilaurate were added under agitation. The product was then mixed for 3 hours at 50° C. at which point 9.39 grams of 2-phosphonobutane-1,2,3-tricarboxylic acid/dimethylformamide solution (11.5%) were added. The product was washed with 5 milliliters of dry dimethylformamide and charged into the reactor and mixed at 50° C. for further reaction. FTIR was used to monitor the isocyanate group peak until it disappeared. Solvent remaining in the product was removed by vacuum evaporation and the product was dried to constant weight.

Synthesis Example 2

Nitrogen protection was used during the reaction. 9.34 grams of Brij® S100 and 60 milliliters of toluene were combined in a three neck round-bottom flask. Residual water from the mixture was removed by azeotropic distillation. The product was then cooled down to 50° C. at which point 1.07 grams of Tolonate™ HDB-LV in 5 milliliters toluene and 0.10 grams of dibutyltin dilaurate were added under agitation. The product was then mixed for 3 hours at 50° C. at which point 0.600 grams of tartaric acid in 10 milliliters of dimethylformamide were then added. The product was washed with 5 milliliters of dry dimethylformamide and charged into the reactor and mixed at 50° C. for further reaction. FTIR was used to monitor the isocyanate group peak until it disappeared. Solvent remaining in the product was removed by vacuum evaporation and dried to constant weight.

Synthesis Example 3

Nitrogen protection was used during the reaction. 9.34 grams of Brij® S100 and 60 milliliters of toluene were combined in a three neck round-bottom flask. Residual water from the mixture was removed by azeotropic distillation. The product was then cooled down to 50° C. at which point 1.07 grams of Tolonate™ HDB-LV in 5 milliliters toluene and 0.10 grams of dibutyltin dilaurate were added under agitation. The product was then mixed for 3 hours at 50° C. at which point 0.768 grams of citric acid in 10 milliliters of dimethylformamide were added. The product was then washed with 5 milliliters of dry dimethylformamide and charged into the reactor and mixed at 50° C. for further reaction. FTIR was used to monitor the isocyanate group peak until it disappeared. Solvent remaining in the product was removed by vacuum evaporation and the product was dried to constant weight.

Synthesis Example 4

A solution of 2-phosphonobutane-1,2,3-tricarboxylic acid and dimethylformamide was prepared. First, a 50% aqueous solution of 2-phosphonobutane-1,2,4-tricarboxylic acid (Bayhibit AM®) was dried in an oven at 105° C. to remove water from the solution. The residual was dissolved in dry dimethylformamide to form an 11.5% 2-phosphonobutane-1,2,3-tricarboxylic acid/dimethylformamide solution.

Nitrogen protection was used during the reaction. 9.34 grams of Brij® S100 and 60 milliliters of toluene were combined in a three neck round-bottom flask. Residual water from the mixture was removed by azeotropic distillation. The product was cooled down to 70° C. at which point 0.466 grams of isophorone diisocyanate in 5 ml toluene and 0.10 grams of dibutyltin dilaurate were added under agitation. The product was then mixed for 3 hours at 95° C. at which point 4.70 grams of 2-phosphonobutane-1,2,3-tricarboxylic acid/dimethylformamide solution (11.5%) were added. The product was then washed with 5 milliliters of dry dimethylformamide and charged into the reactor and mixed at 85° C. for further reaction. FTIR was used to monitor the isocyanate group peak until it disappeared. Solvent remaining in the product was removed by vacuum evaporation and the product was dried to constant weight.

Synthesis Example 5

Nitrogen protection was used during the reaction. 9.34 grams of Brij® S100 and 60 milliliters of toluene were combined in a three neck round-bottom flask. Residual water from the mixture was removed by azeotropic distillation. The product was cooled down to 70° C. at which point 0.466 grams of isophorone diisocyanate in 5 milliliters toluene and 0.10 grams of dibutyltin dilaurate were added under agitation. The product was then mixed for 3 hours at 95° C. at which point 0.300 grams of tartaric acid in 10 milliliters dimethylformamide were added. The product was then washed with 5 milliliters of dry dimethylformamide and charged into the reactor and mixed at 85° C. for further reaction. FTIR was used to monitor the isocyanate group peak until it disappeared. Solvent remaining in the product was removed by vacuum evaporation and the product was dried to constant weight.

Synthesis Example 6

Nitrogen protection was used during the reaction. 9.34 grams of Brij® S100 and 60 milliliters of toluene were combined in a three neck round-bottom flask. Residual water was removed by azeotropic distillation. The product was cooled down to 70° C. at which point 0.466 grams of isophorone diisocyanate in 5 milliliters of toluene and 0.10 grams of dibutyltin dilaurate were also added under agitation. The product was mixed 3 hours at 95° C. at which point 0.384 grams of citric acid in 10 milliliters dimethylformamide were added. The product was then washed with 5 milliliters of dry dimethylformamide and charged into the reactor and mixed at 85° C. for further reaction. FTIR was used to monitor the isocyanate group peak until it disappeared. Solvent remaining in the product was removed by vacuum evaporation and the product was dried to constant weight.

Synthesis Example 7

Nitrogen protection was used during the reaction. 14.01 grams of Brij® S100 and 80 milliliters of toluene were combined in a three neck round-bottom flask. Residual water was removed by azeotropic distillation. The product was cooled down to 70° C. at which point 0.699 grams of isophorone diisocyanate in 5 milliliters of toluene and 0.15 grams of dibutyltin dilaurate were added under agitation. The product was mixed 3 hours at 95° C. The temperature was lowered down to 50° C. at which point 0.264 grams of N,N-dimethylethylenediamine were added. FTIR was used to monitor the isocyanate group peak until it disappeared. The mixture was cooled down to room temperature and 0.366 g of 1,3-propanesultone was added. The product was mixed 2 hours at ambient condition. Solvent remaining in the product was removed by vacuum evaporation and the product was dried to constant weight. Similar polymers were synthesized using carboxylate as well as phosphate based betaines.

Testing of Synthesis Examples

In order to test the polymers synthesized as described above, each polymer was dissolved in mixture of propylene glycol and water. The polymer was then used to treat titanium dioxide during the preparation of a titanium dioxide slurry. The titanium dioxide used was universal grade CR-826 pigment from Tronox LLC.

The titanium dioxide slurries were made with a hydrophilic acrylic acid copolymer based dispersant. Each synthesized polymer was added to the titanium dioxide particles in an amount in the range of from 0.02% by weight to 2% by weight based on the weight of the titanium dioxide particles.

The polymer modified titanium dioxide pigments were then evaluated for tint strength. The obtained slurries were tested in one or more of the following various model latex paint formulations with different types of resins including acrylic latex (Rhoplex™ VSR-50), styrene acrylic latex (EPS 2512) and polyvinyl acrylic latex (Rovace® 9900) (Tables 1-3). In each test, a polymer modified, pigment-latex composite was made by mixing the slurry including the corresponding polymer modified titanium dioxide pigment particles with the type of resin particles present in the corresponding latex paint formulation at low shear so that the amount of the resin particles present in the composite was in the range of from about 20% to about 70% by weight based on the weight of the titanium dioxide particles. The composite slurry was mixed for 15 minutes at low speed and then added to the paint formulation. 100 grams of the paint were tinted with 1.00 gram of Color Trend® 808-9907 universal carbon black colorant. The color acceptance was tested by the color rub-up method.

For each formulation system, two samples were prepared: (1) a paint with 100% titanium dioxide (no reduction of the amount titanium dioxide and the titanium dioxide was not polymer modified in accordance with the invention) for use as a control, and a paint made with 85% titanium dioxide (the amount of titanium dioxide used was reduced by 15%) and the titanium dioxide was the inventive polymer modified titanium dioxide.

In the samples, either polymeric pigment (Ropaque® Ultra) or other extenders were added to keep the same PVC as controls. The tinting strength was measured on UltraScan® XE assuming the tinting strength of the control is 100%. The control and the paint including the inventive polymer modified titanium pigment samples were prepared in identical formulations. Both paints were then drawn down side by side on a Leneta® card. The CIE L* and b* values of the dried paints were measured using an integrating sphere spectrophotometer and these values were used to calculate the tint strength and tint tone.

Tint strength was calculated using the Kubelka Munk Equation where:

$$\text{Tint Strength} = \left( \frac{\left(\frac{K}{S}\right)_{Standard}}{\left(\frac{K}{S}\right)_{Sample}} \right) (\text{Assigned Value})$$

where: K=Absorbance of carbon black pigment
S=Scatter of titanium dioxide pigment
Tint Tone was calculated as follows:

$$\text{TintTone} = b^*_{sample} - b^*_{standard} + \text{Assigned Value}$$

Testing Example 8

First, a polymer modified titanium dioxide pigment composition made as described above using the polymer synthesized in Example 1 was tested as described above in three model latex paint formulations with different types of resins. The results are listed in Tables 1, 1A, 2, 2A, 3 and 3A below:

TABLE 1

24% PVC high quality gloss paint formulation (with 2.04 lbs/gal of titanium dioxide)

| Control with 100% TiO₂ (not polymer modified) | Gallons | Sample with 85% TiO2 (the inventive polymer modified TiO₂ synthesized in Example 1) | Gallons |
|---|---|---|---|
| Millbase | | Millbase | |
| Water | 3.5 | Water | 3.5 |
| Propylene Glycol | 0.81 | Propylene Glycol | 0.81 |
| TAMOL ® 165A | 0.55 | TAMOL ® 165A | 0.55 |
| TEXANOL ® | 1 | TEXANOL ® | 1 |
| TRITON ® GR-7M | 0.25 | TRITON ® GR-7M | 0.25 |
| KATHON ® LX 1.5% | 0.18 | KATHON ® LX 1.5% | 0.18 |
| Mix well before adding the following | | Mix well before adding the following | |
| Let Down | | Let Down | |
| RHOPLEX ™ VSR-50 Add the millbase | 63.14 | RHOPLEX ™ VSR-50 Add the millbase | 50.26 |
| TiO₂ Slurry (76.5% solids) (control: contains no polymer) | 13.64 | Composite of polymer modified TiO₂ and Resin VSR-50 | 24.47 |
| ROPAQUE ® Ultra | 4.37 | ROPAQUE ® Ultra | 6.43 |
| TEGO ® Foamex-8030 | 0.25 | TEGO ® Foamex-8030 | 0.25 |
| Ammonia (28%) | 0.25 | Ammonia (28%) | 0.25 |
| pre-mix the next three items before adding | | pre-mix the next three items before adding | |
| Water | 6.00 | Water | 6.00 |
| ACRYSOL ® RM-2020 NPR | 3.15 | ACRYSOL ® RM-2020 NPR | 3.15 |
| ACRYSOL ® RM-8W | 0.3 | ACRYSOL ® RM-8W | 0.3 |
| Water (rinse) | 2.63 | Water (rinse) | 2.63 |
| Total Millbase | 6.29 | Total Millbase | 6.29 |
| Total Letdown | 93.72 | Total Letdown | 93.73 |
| Total Paint | 100.01 | Total Paint | 100.02 |

TABLE 1A

Paint properties with 15% reduction of titanium dioxide from TABLE 1

| | TiO₂ reduction | |
|---|---|---|
| | 0% | 15% |
| Tint Strength, % (Lampblack 808) | 100 | 104 |
| Raw L*, tinted paint | 72.65 | 73.12 |
| Tint Tone, Δb | 0.00 | 0.26 |
| Contrast Ratio, @ 2.5 mils | 0.98 | 0.98 |
| Gloss @ 60° | 69 | 68 |
| Initial Viscosity, KU | 106 | 103 |
| Color Acceptance | Pass | Pass |

TABLE 2

36% PVC Polyvinyl acrylic latex (with 2.23 lbs/gal of titanium dioxide)

| Control with 100% TiO₂ (not polymer modified) | Gal | Sample with 85% TiO2 (the inventive polymer modified TiO₂ synthesized in Example 1) | Gal |
|---|---|---|---|
| Millbase | | Millbase | |
| Propylene Glycol | 2.89 | Propylene Glycol | 2.89 |
| Water | 12.85 | Water | 14.11 |
| Biocide/Fungicide (mixture of bicyclic oxazolidines) | 0.11 | Biocide/Fungicide (mixture of bicyclic oxazolidines) | 0.11 |
| mix 5 min | | mix 5 min | |
| TAMOL ® 1254 | 0.88 | TAMOL ® 1254 | 0.88 |
| TAMOL ® 851 | 0.26 | TAMOL ® 851 | 0.26 |
| Aluminosilicate clay | 4.10 | Aluminosilicate clay | 5.13 |
| Defoamer | 0.125 | Defoamer | 0.13 |
| check grind after 10 min, switch to low speed | | check grind after 10 min, switch to low speed | |
| IGEPAL ® CA-630 | 0.48 | IGEPAL ® CA-630 | 0.48 |
| Water | 7.6 | Water | 7.6 |
| Letdown | | Letdown | |
| TRONOX ® CR-826 (76.5% Solids) (control: contains no polymer) | 14.85 | Composite of polymer modified TRONOX ® CR-826 + ROVACE ® 9900 | 24.07 |

TABLE 2-continued

36% PVC Polyvinyl acrylic latex (with 2.23 lbs/gal of titanium dioxide)

| Control with 100% TiO$_2$ (not polymer modified) | Gal | Sample with 85% TiO$_2$ (the inventive polymer modified TiO$_2$ synthesized in Example 1) | Gal |
|---|---|---|---|
| ROVACE ® 9900 PVA Latex (55% Solids) | 36.32 | ROVACE ® 9900 PVA Latex (55% Solids) | 24.82 |
| ACRYSOL ® DR-5500 | 0.80 | ACRYSOL ® DR-5500 | 0.80 |
| Add the grind | | Add the grind | |
| Premix the next two | | Premix the next two | |
| Water | 5.50 | Water | 5.50 |
| NATROSOL ® Plus 330 | 0.49 | NATROSOL ® Plus 330 | 0.49 |
| Water | 1.43 | Water | 1.43 |
| Ammonia | 0.31 | Ammonia | 0.31 |
| Defoamer | 0.5 | Defoamer | 0.5 |
| Water | 9.72 | Water | 9.24 |
| P.G. Water Float | 0.82 | P.G. Water Float | 0.82 |
| Total Millbase | 29.30 | Total Millbase | 31.59 |
| Total Let down | 70.73 | Total Let down | 67.97 |
| Total paint | 100.02 | Total paint | 99.56 |

TABLE 2A

Paint properties with 15% reduction of titanium dioxide from TABLE 3

| | TiO$_2$ reduction | |
|---|---|---|
| | 0% | 15% |
| Tint Strength, % (LampBlack 808) | 100 | 98 |
| Raw L*, tinted paint | 77.45 | 77.21 |
| Tint Tone, Δb | 0.00 | 0.17 |
| Contrast Ratio | 0.97 | 0.97 |
| Sheen @ 85° | 13 | 7.7 |
| Color Acceptance | Pass | Pass |

TABLE 3A

Paint properties with 15% reduction of titanium dioxide from TABLE 3

| | TiO$_2$ reduction | |
|---|---|---|
| | 0% | 15% |
| Tint Strength, % (LampBlack 808) | 100 | 103 |
| Raw L*, tinted paint | 78.23 | 78.52 |
| Tint Tone, Δb | 0.00 | 0.13 |
| Contrast Ratio | 0.98 | 0.98 |
| Gloss 60 | 51 | 51 |
| KU | 87.5 | 97.3 |
| pH | 8.6 | 8.8 |
| Color Acceptance | pass | pass |

TABLE 3

19% PVC Styrene acrylic latex formulation (with 2.25 lbs/gal titanium dioxide)

| Materials | Gallons | Materials | Gallons |
|---|---|---|---|
| Add in order with good agitation | | Add in order with good agitation | |
| EPS 2512 (45% Solids) | 65.9 | EPS 2512 (45% Solids) | 51.16 |
| Universal TiO2 Slurry (76.5%) (control: contains no polymer) | 15.01 | Composite of polymer modified TiO$_2$ synthesized in Example 1 and EPS 2512 (45% Solids) | 27.50 |
| Ammonium Hydroxide | 0.27 | Ammonium Hydroxide | 0.27 |
| NUOSEPT ® 498/PROXEL ® GXL | 0.21 | ROPAQUE ® Ultra | 1.94 |
| Mix for 20 min before adding the following | | NUOSEPT ® 498/PROXEL ® GXL | 0.21 |
| TAMOL ® 681 | 0.68 | Mix for 20 min before adding the following | |
| SURFYNOL ® PSA-336 | 0.46 | TAMOL ® 681 | 0.57 |
| Octafoam ™ S-675/BYK024/Airex 901W | 0.48 | SURFYNOL ® PSA-336 | 0.46 |
| AMP-95 | 0.13 | Octafoam ™ S-675/BYK024/Airex 901W | 0.48 |
| Premix the following, add with good agitation | | AMP-95 | 0.13 |
| Water | 1.80 | Premix the following, add with good agitation | |
| DPnB | 3.39 | Water | 1.80 |
| Add with good agitation | | DPnB | 3.39 |
| ACRYSOL ® RM-5000 | 0.69 | Add with good agitation | |
| ACRYSOL ® RM-825 | 0.34 | ACRYSOL ® RM-5000 | 0.69 |
| Water | 10.68 | ACRYSOL ® RM-825 | 0.34 |
| | | Water | 11.1 |
| Total Paint | 100.04 | | 100.05 |

The results show that, with the use of inventive polymer, it is possible to reduce the amount of titanium dioxide in a latex based paint formulation by around 15% and yet still achieve similar quality paint compositions compared to those compositions without a reduction in titanium dioxide. One having skill in the art will recognize that the compositions and methods contained the present disclosure will be applicable to a wide variety of latex based paint compositions.

Testing Example 9

Next, polymer modified titanium dioxide pigment compositions made as described above using the polymers synthesized in Example 1, 3, 4, 5 and 6 were tested as described above in a 24% PVC semi-gloss acrylic paint formulation using the composite process (sample formula: Table 4) at 100% TiO2 loading against the control in the standard process (control formula: Table 4A). The paint properties are listed in Table 4B.

TABLE 4

24% PVC Semi-gloss Paint Sample Formulation in Composite Process (with 2.5 lbs/gal Titanium Dioxide)

| Material | Weight (g) |
| --- | --- |
| Rhoplex ™ VSR-2015 | 35 |
| TiO$_2$ Pigment slurry (with polymer modification) | 78 |
| Premix the above resin and TiO2 Slurry for 15 minutes to form composite, then add following in order | |
| Rhoplex ™ VSR-2015 | 79 |
| BYK-24 | 0.6 |
| Dextrol ™ OC-50 | 0.3 |
| Proxel ™ GXL | 0.1 |
| 2.5% Natrosol ™ 250MR solution** | 32 |
| AMP-95 ® | 0.2 |
| Water* | 11.2 |
| ColorTrend 808-9907 lamp black | 1.6 |
| Total Paint Weight | 238 |

TABLE 4A

24% PVC Semi-gloss Paint Control Formulation in Standard Process (with 2.5 lbs/gal Titanium Dioxide)

| Material | Weight (g) |
| --- | --- |
| Rhoplex ™ VSR-2015 | 114 |
| TiO$_2$ Pigment slurry (without polymer) | 78 |
| BYK-24 | 0.6 |
| Dextrol ™ OC-50 | 0.3 |
| Proxel ™ GXL | 0.1 |
| 2.5% Natrosol ™ 250MR solution** | 32 |
| AMP-95 ® | 0.2 |
| Water* | 11.2 |
| ColorTrend 808-9907 lamp black | 1.6 |
| Total Paint Weight | 238 |

TABLE 4B

Paint properties with polymer modified titanium dioxide in composite process

| | Control | 0.1% polymer Synthesis Example 1 | 0.1% polymer Synthesis Example 3 | 0.05% polymer Synthesis Example 4 | 0.05% polymer Synthesis Example 5 | 0.05% polymer Synthesis Example 6 |
| --- | --- | --- | --- | --- | --- | --- |
| Paint process | Standard process | Composite Process | Composite Process | Composite Process | Composite Process | Composite Process |
| TS (%) | 100 | 119 | 105 | 107 | 106 | 106 |
| Tint Tone | 0 | −0.03 | 0.04 | −0.05 | −0.04 | −0.02 |
| 60 gloss | 72.6 | 73.2 | 73.5 | 74.3 | 73.7 | 73.3 |
| Color acceptance | Pass | Slight | Pass | Pass | Pass | Pass |
| Viscosity (KU) | 84.3 | 89.3 | 89.4 | 88.3 | 85.6 | 86.8 |

The results are similar to the results obtained in Testing Example 8.

While the technology has been particularly shown and described with reference to specific embodiments, it should be understood by those skilled in the art that various changes in form and detail may be made without departing from the spirit and scope of the technology as defined by the appended claims.

What is claimed is:

What is claimed is:
1. A polymer modified titanium dioxide pigment that is capable of forming a composite with latex particles when admixed therewith, comprising:
   a plurality of titanium dioxide particles; and
   a polymer associated with said titanium dioxide particles, said polymer including:
      a water soluble polymer backbone;
      at least one hydrophobic functional group attached to said polymer backbone and having an affinity for latex; and
      at least one functional group attached to said polymer backbone and bonded to said titanium dioxide particles, wherein said functional group attached to said polymer backbone and bonded to said titanium dioxide particles is formed by the reaction of said polymer backbone with a compound selected from the group consisting of acids of phosphorous, hydroxyl carboxylic acid, salts of hydroxyl carboxylic acid, polycarboxylic acid, salts of polycarboxylic acid, carboxylate based betaines, sulfonate based betaines, phosphate based betaines and mixtures thereof.

2. The polymer modified titanium dioxide pigment of claim 1, wherein said functional group attached to said polymer backbone and bonded to said titanium dioxide particles is formed by the reaction of said polymer backbone with a compound selected from the group consisting of phosphonic-carboxylic acid, salts of phosphonic-carboxylic acid, hydroxyl carboxylic acid, salts of hydroxyl carboxylic acid, polycarboxylic acid, salts of polycarboxylic acid, carboxylate based betaines, sulfonate based betaines, phosphate based betaines and mixtures thereof.

3. The polymer modified titanium dioxide pigment of claim 2, wherein said functional group attached to said polymer backbone and bonded to said titanium dioxide particles is formed by the reaction of said polymer backbone with a compound selected from the group consisting of phosphonic-carboxylic acid and salts of phosphonic-carboxylic acid.

4. The polymer modified titanium dioxide pigment of claim 3, wherein said functional group attached to said polymer backbone and bonded to said titanium dioxide particles is formed by the reaction of said polymer backbone with 2-phosphonobutane-1,2,4-tricarboxylic acid.

5. The polymer modified titanium dioxide pigment of claim 2, wherein said functional group attached to said polymer backbone and bonded to said titanium dioxide particles is formed by the reaction of said polymer backbone with a compound selected from the group consisting of hydroxyl carboxylic acid and salts of hydroxyl carboxylic acid.

6. The polymer modified titanium dioxide pigment of claim 5, wherein said functional group attached to said polymer backbone and bonded to said titanium dioxide particles is formed by the reaction of said polymer backbone with a compound selected from the group consisting of citric acid, tartaric acid and mixtures thereof.

7. The polymer modified titanium dioxide pigment of claim 2, wherein said functional group attached to said polymer backbone and bonded to said titanium dioxide particles is formed by the reaction of said polymer backbone with a compound selected from the group consisting of carboxylate based betaines, sulfonate based betaines, phosphate based betaines and mixtures thereof.

8. The polymer modified titanium dioxide pigment of claim 1, wherein said hydrophobic functional group attached to said polymer backbone and having an affinity for latex is a super hydrophobic functional group.

9. The polymer modified titanium dioxide pigment of claim 1, wherein said hydrophobic functional group attached to said polymer backbone and having an affinity for latex is formed by the reaction of said polymer backbone with a compound selected from the group of aliphatic compounds, aromatic compounds and aliphatic-aromatic compounds.

10. The polymer modified titanium dioxide pigment of claim 1, wherein said hydrophobic functional group attached to said polymer backbone and having an affinity for latex is formed by the reaction of said polymer backbone with an alcohol.

11. The polymer modified titanium dioxide pigment of claim 10, wherein said hydrophobic functional group attached to said polymer backbone and having an affinity for latex is formed by the reaction of said polymer backbone with a compound selected from the group consisting of fatty alcohols, saturated ethoxylated alcohols, alkyl phenols, aryl phenols, ethoxylated alkyl phenols and ethoxylated aryl phenols.

12. The polymer modified titanium dioxide pigment of claim 1, wherein said hydrophobic functional group attached to said polymer backbone and having an affinity for latex is formed by the reaction of said polymer backbone with a compound selected from the group consisting of esters, thiols, acids, anhydrides and acyl halides.

13. The polymer modified titanium dioxide pigment of claim 1, wherein said water soluble polymer backbone comprises nitrogen.

14. The polymer modified titanium dioxide pigment of claim 13, wherein said water soluble polymer backbone is selected from the group consisting of polyvinylpyrrolidone, polyethylenimine, polyoxazolines and polyamides.

15. The polymer modified titanium dioxide pigment of claim 1, wherein said water soluble polymer backbone is selected from the group consisting of polyoxymethylene, polysaccharide, polyoxazoline, and polyvinyl ether.

16. The polymer modified titanium dioxide pigment of claim 1, wherein said water soluble polymer backbone is a polyoxyalkylene polymer or copolymer.

17. The polymer modified titanium dioxide pigment of claim 1, wherein said polymer has the following formula:

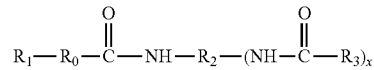

wherein $R_0$ is said water soluble polymer backbone, $R_1$ is said hydrophobic functional group attached to said polymer backbone and having an affinity for latex, $R_2$ is formed by the reaction of a diisocyanate or polyisocyanate with said water soluble polymeric backbone, $R_3$ is said functional group attached to said polymer backbone and capable of forming a bond with titanium dioxide, and x is any integer greater than or equal to one.

18. The polymer modified titanium dioxide pigment of claim 17, wherein $R_0$ has the following formula:

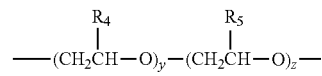

wherein $R_4$ and $R_5$ are compounds selected from the group consisting of hydrogen, methyl, ethyl, propyl, butyl, or pentyl group and wherein y and z can both be any integer greater than or equal to one.

19. The polymer modified titanium dioxide pigment of claim 1, wherein said polymer is present in said polymer modified titanium dioxide pigment in an amount in the range of from about 0.02% to about 2% by weight, based on the weight of said titanium dioxide particles.

20. The polymer modified titanium dioxide pigment of claim 1, further comprising an aqueous media.

* * * * *

UNITED STATES PATENT AND TRADEMARK OFFICE
CERTIFICATE OF CORRECTION

PATENT NO. : 9,745,405 B2
APPLICATION NO. : 14/691185
DATED : August 29, 2017
INVENTOR(S) : Quan Su and Venkata Rama Rao Goparaju It is certified that error appears in the above-identified patent and that said Letters Patent is hereby corrected as shown below:

In the Specification

In Column 7, Line 57, delete "Brij™" and insert --polyoxyethylene-- therefor.

Delete the formula at the bottom of Columns 11 and 12 and continuing to Columns 13 and 14, and insert the following formula:

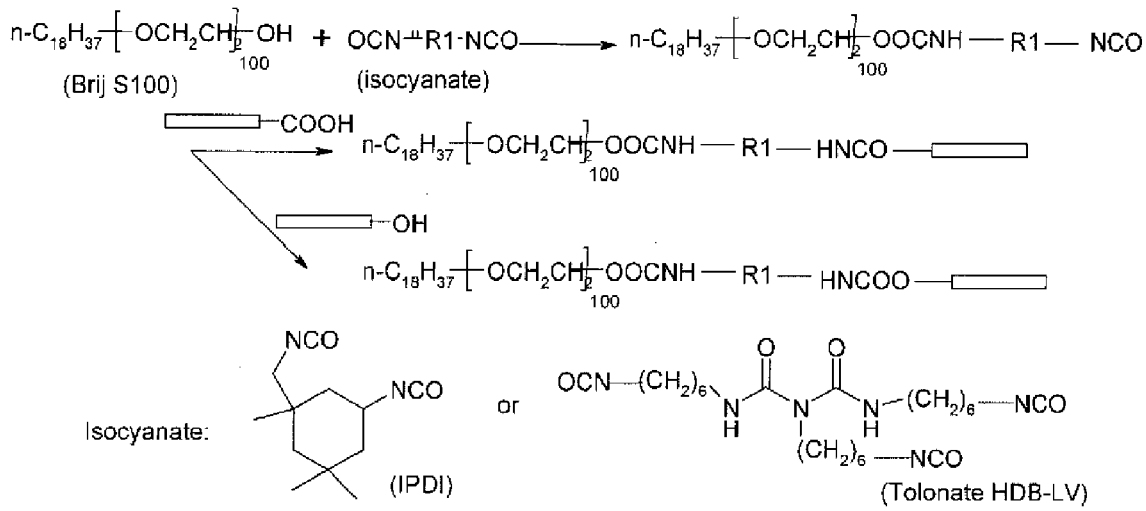

Signed and Sealed this
Fourteenth Day of November, 2017

Joseph Matal
*Performing the Functions and Duties of the
Under Secretary of Commerce for Intellectual Property and
Director of the United States Patent and Trademark Office*